(12) United States Patent
Nguyen et al.

(10) Patent No.: US 9,778,425 B2
(45) Date of Patent: Oct. 3, 2017

(54) FIBER OPTIC CONNECTOR AND PIN KEEPER WITH FIELD CHANGEABLE GUIDE PINS

(71) Applicant: US Conec, Ltd., Hickory, NC (US)

(72) Inventors: Hiep V. Nguyen, Fort Mill, SC (US); Darrell R. Childers, Hickory, NC (US); Michael E. Hughes, Hickory, NC (US); Myron W. Yount, Conover, NC (US); Brent D. Henley, Maiden, NC (US)

(73) Assignee: US Conec, Ltd, Hickory, NC (US)

( * ) Notice: Subject to any disclaimer, the term of this patent is extended or adjusted under 35 U.S.C. 154(b) by 31 days.

(21) Appl. No.: 14/880,794

(22) Filed: Oct. 12, 2015

(65) Prior Publication Data

US 2017/0102505 A1 Apr. 13, 2017
US 2017/0205589 A9 Jul. 20, 2017

Related U.S. Application Data

(60) Provisional application No. 62/062,490, filed on Oct. 10, 2014.

(51) Int. Cl.
*G02B 6/36* (2006.01)
*G02B 6/38* (2006.01)

(52) U.S. Cl.
CPC ......... *G02B 6/3882* (2013.01); *G02B 6/3869* (2013.01); *G02B 6/3885* (2013.01)

(58) Field of Classification Search
CPC .. G02B 6/3821; G02B 6/3825; G02B 6/3849; G02B 6/387; G02B 6/3882; G02B 6/3885; G02B 6/3887; G02B 6/3897; G02B 6/4459; G02B 6/4463; G02B 6/4471; G02B 6/4476; G02B 6/50
USPC ....................................................... 385/53–87
See application file for complete search history.

(56) References Cited

U.S. PATENT DOCUMENTS

2012/0281951 A1* 11/2012 Takahashi ............ G02B 6/3846
385/80

* cited by examiner

*Primary Examiner* — Akm Enayet Ullah
*Assistant Examiner* — Michael Mooney
(74) *Attorney, Agent, or Firm* — Michael L. Leetzow, P.A.

(57) ABSTRACT

A new pin keeper and a connector that uses the pin keeper allows for installation and removal of guide pins within the pin keeper and the fiber optic connector in the field. The pin keeper may have latches that are accessible to disengage from a guide pin to allow removal or a tool may be used to widen openings in the pin keeper to allow the guide pins to be inserted or removed. Alternatively, the guide pin may be rotated to engage or disengage the pin keeper.

17 Claims, 11 Drawing Sheets

FIBER OPTIC CONNECTOR AND PIN KEEPER WITH FIELD CHANGEABLE GUIDE PINS

REFERENCE TO RELATED CASE

This application claims priority under 35 U.S.C. §119 (e) to provisional application No. 62/062,490 filed on Oct. 10, 2014, the contents of which are hereby incorporated by reference in their entirety.

BACKGROUND OF THE INVENTION

Field of the Invention

Fiber optic connectors, particularly ones with more components to them, like the MTP connectors, are assembled with guide pins either installed or not installed. It is difficult, if not impossible, to change this configuration once the fiber optic connector is in the field. Thus, if the installer has two fiber optic connectors of one configuration (male or female) that need to be mated together, the installer has a problem. The installer can attempt to remove or add guide pins, but the fiber optic connector may be ruined during the disassembly and reassembly in the field.

Thus, a fiber optic connector that allows for the guide pins to be inserted or removed in the field (or anywhere, really) without removing any other components of the fiber optic connector is needed.

SUMMARY OF THE INVENTION

The present invention is directed to pin-keeper for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, the pin-keeper including a first portion to receive a first guide pin, a second portion to receive to a second guide pin, a bridge portion connecting the first portion and the second portion, a first guide pin opening in each of the first and second portions to receive a portion of a guide pin therein, the first guide pin openings in the first and second portions of the pin-keeper aligned with the guide pin openings in the fiber optic ferrule when the fiber optic ferrule and pin-keeper are disposed within the fiber optic connector, a first latch associated with the first portion and having a second guide pin opening therein, the first latch and the second guide pin opening therein movable relative to the first portion and the first guide pin opening therein, and a second latch associated with the second portion and having a second guide pin opening therein, the second latch and the second guide pin opening therein movable relative to the second portion and the first guide pin opening therein.

In some embodiments, the first and second latches are disposed adjacent an opening in the fiber optic connector.

In some other embodiments, the latch is moveable between a first position and a second position, and wherein in the first position the first and second guide pin openings are not aligned with one another.

In another embodiment, the first latch is connected to the first portion and the second latch is attached to the second portion.

According to another aspect of the present invention, combination of a pin-keeper and guide pin for use with a fiber optic connector is disclosed, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein that includes a pin-keeper that includes a first portion to receive a first guide pin, a second portion to receive to a second guide pin, a bridge portion connecting the first portion and the second portion, a guide pin opening in each of the first and second portions to receive a portion of a guide pin therein, the guide pin openings in the first and second portions of the pin-keeper aligned with the guide pin openings in the fiber optic ferrule when the fiber optic ferrule and pin-keeper are disposed within the fiber optic connector, wherein the guide pin openings in each of the first and second portions having an elongated configuration, and at least one guide pin that includes an elongate cylindrical element having a rounded front end, a rear end, and a groove dispose between the elongate cylindrical element and the rear end, the groove being circular in cross section and having a diameter smaller than the elongate cylindrical element.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
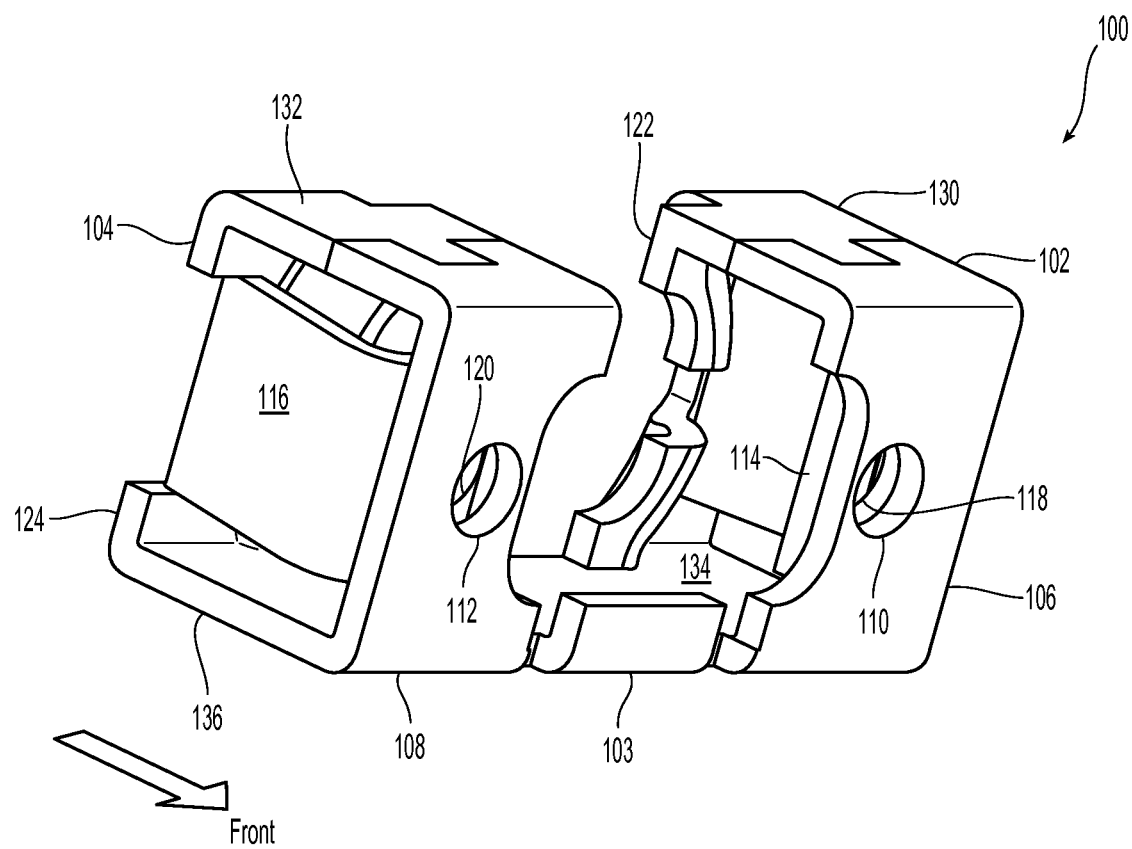
FIG. 1 is a perspective view of one embodiment of a pin keeper according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
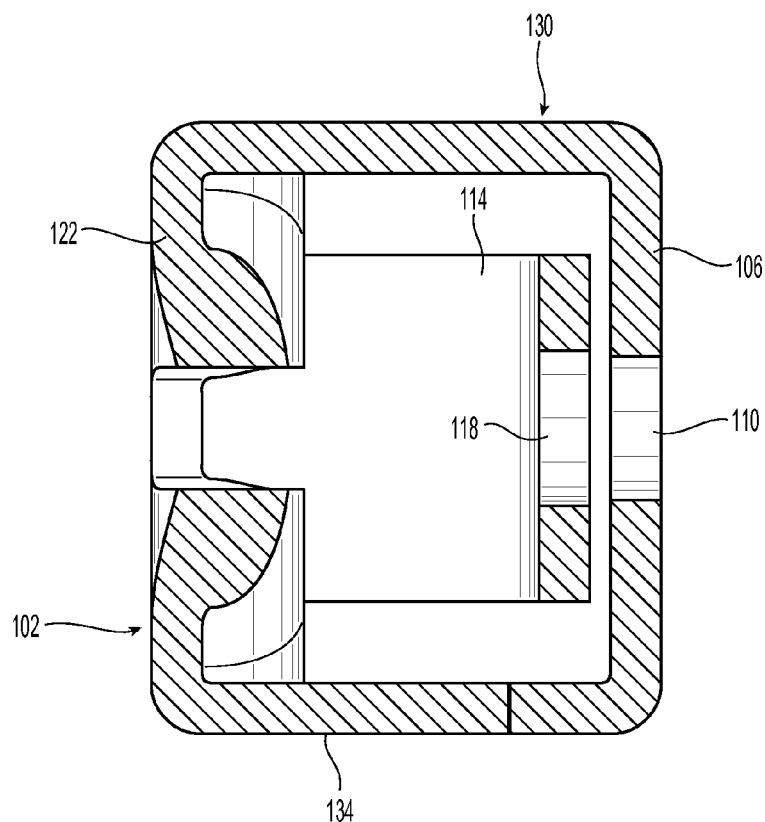
FIG. 2 is a perspective view of a cross section of a portion of the pin keeper of FIG. 1.

Referring to FIGS. 1 and 2 is one embodiment of a pin keeper 100 according to the present invention that is used with a multi-fiber ferrule that is installed in a fiber optic connector. See FIG. 6. As is known in the art, a pin keeper is installed behind the fiber optic ferrule to hold the guide pins in the ferrule (for the male version) when the fiber optic connector is mated and unmated with another fiber optic connector so that the pins are not removed from the fiber optic connector. In the female version, the pin keeper is usually used keep the spacing correct within the fiber optic connector. The pin keeper 100 has a first portion 102 and a second portion 104, the first and second portions 102, 104 generally aligning with a respective side of the fiber optic ferrule and the guide pin holes therein. The two portions 102,104 are connected to one another by a bridge portion 103, that can be either on the top or the bottom of the pin keeper 100, but it must be out of the way of the optical fibers that pass through the pin keeper 100 to be secured with in the fiber optic ferrule. The first and second portions 102,104 each have a front wall 106,108, respectively that includes a first guide pin opening 110, 112. The term "front" and "forward" as used herein means that direction which the fiber optic connector would mate with another fiber optic connector or device, while the term rear is used to mean the direction from which the optical fibers come. So turning to FIG. 1, the front is the direction shown by the arrow and "back" or "rearward" is the opposite direction. Thus, the front of the pin keeper 100 is that portion that is immediately adjacent the fiber optic ferrule.

Each of the portions 102, 104 also have a latch 114, 116 that has a second guide pin opening 118,120. The latches 114,116 are movable relative to the front walls 106,108, thus making the first guide pin openings 110, 112. and second guide pin openings 118,120 movable relative to one another. As illustrated in FIGS. 1 and 2, the latches 114,116 extend from a rear wall 122,124 from the respective first and second portions 102,104 in a cantilevered fashion. Other ways of connecting the latches 114,116 to the first and second portions 102,104 or otherwise disposing them relative to the the front walls 106,108, is possible. As can be seen in the figures, the first and second portions 102,104 also have top walls 130,132 and bottom walls 134,136.

Figure 3:
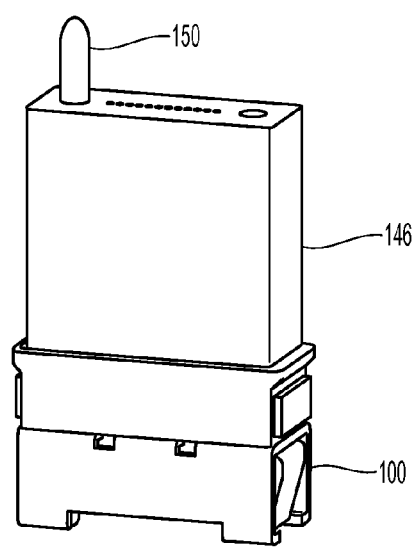
FIG. 3 is a perspective view of the pin keeper of FIG. 1 with a guide pin and a ferrule assembled together.

The pin keeper 100 is disposed against the rear face of a fiber optic ferrule 146 as illustrated in FIG. 3. The pin keeper 100 is sandwiched between the ferrule and a spring within a fiber optic connector (not shown). If the fiber optic connector is configured to be a male connector, then the guide pins secured within the pin keeper 100 maintains the fiber optic ferrule 146 and the pin keeper 100 in alignment.

The pin keeper 100 is preferably made from stamped sheet metal that is then formed into the pin keeper 100. The material for the sheet can be plated beryllium copper, stainless steel, or other appropriate metals. As an alternative, the pin keeper 100 could be made of a plastic material or even a plastic material with the areas around the guide pin openings being made of metal, including the metals noted above.

Figure 4:
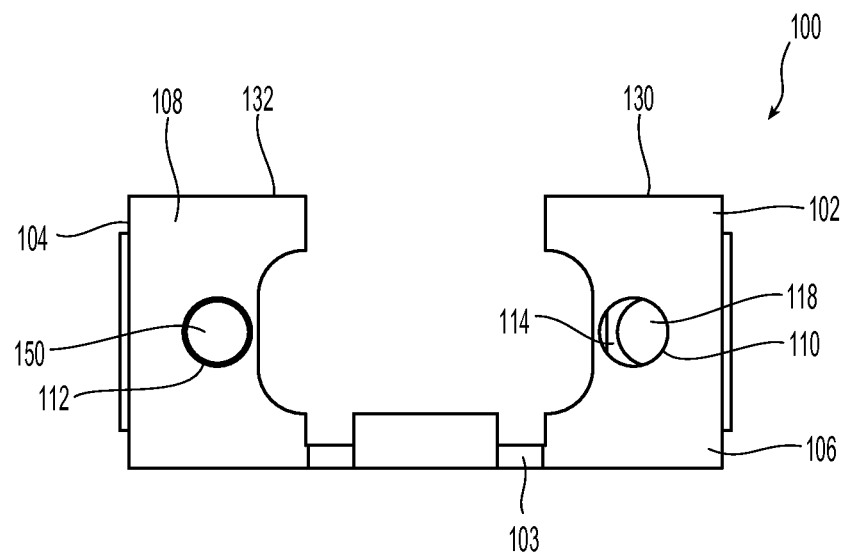
FIG. 4 is a front view of the pin keeper of FIG. 1 with a guide pin installed on one side and showing the alignment of the guide pin openings therein.
Figure 5:
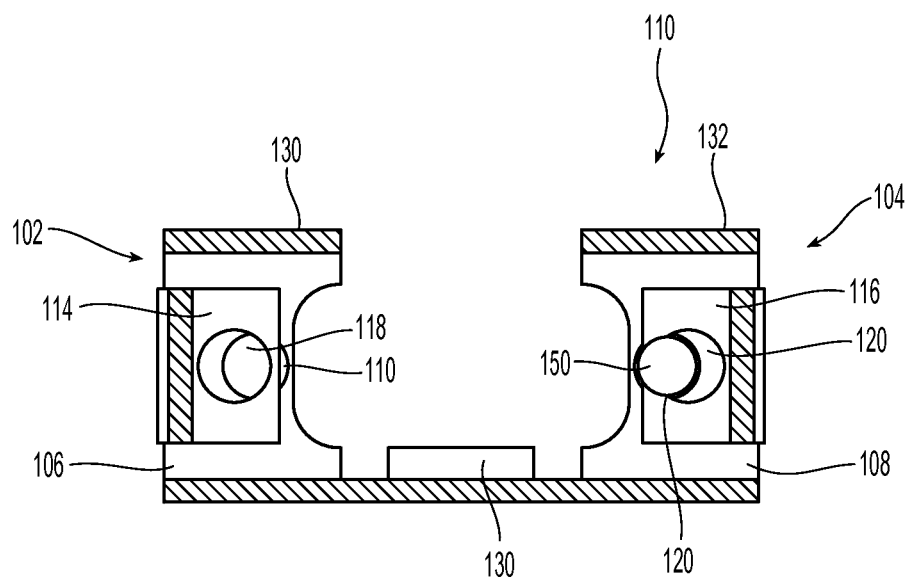
FIG. 5 is a rear, cross sectional view of the pin keeper of FIG. 4.

Turning now to FIGS. 4 and 5, where a pin keeper 100 has, for illustration purposes only, a single guide pin 150 inserted on one side, second portion 104. The latch 116 is biased relative to the front wall 108 such that the second guide pin opening 120 is to the outside of the first guide pin opening 112. Thus, when the latch is pushed inward toward the bridge portion 103, the second guide pin opening 120 and the first guide pin opening 112 will align, thereby allowing a guide pin 150 to be inserted into the first and second guide pin openings 110,112. When the latch 116 is released, the latch 116 moves outward and away from bridge portion 103, pinching the guide pin 150 against the surfaces that make up the second guide pin opening 120 and the first guide pin opening 112. As can be seen on the right side in FIG. 4, the latch 114 is biased outwardly (away from the bridge portion 103) as a portion of the latch 114 is visible through the first guide pin opening 110.

FIG. 5 is a rear elevational view of a cross section of the pin keeper of FIG. 4. The the latches 114,116 and their respective second guide pin openings 118,120 are visible. The rear end of guide pin 150 is also visible as it protrudes through the latch 116 and the second guide pin opening 120. On the left side of the figure, the relationship of the first and second guide pin openings 110, 118, respectively. Based on the overlap of the first and second guide pin openings, it is clear that the guide pin 150 would be held by the front wall 106 and the latch 114.

Figure 6:
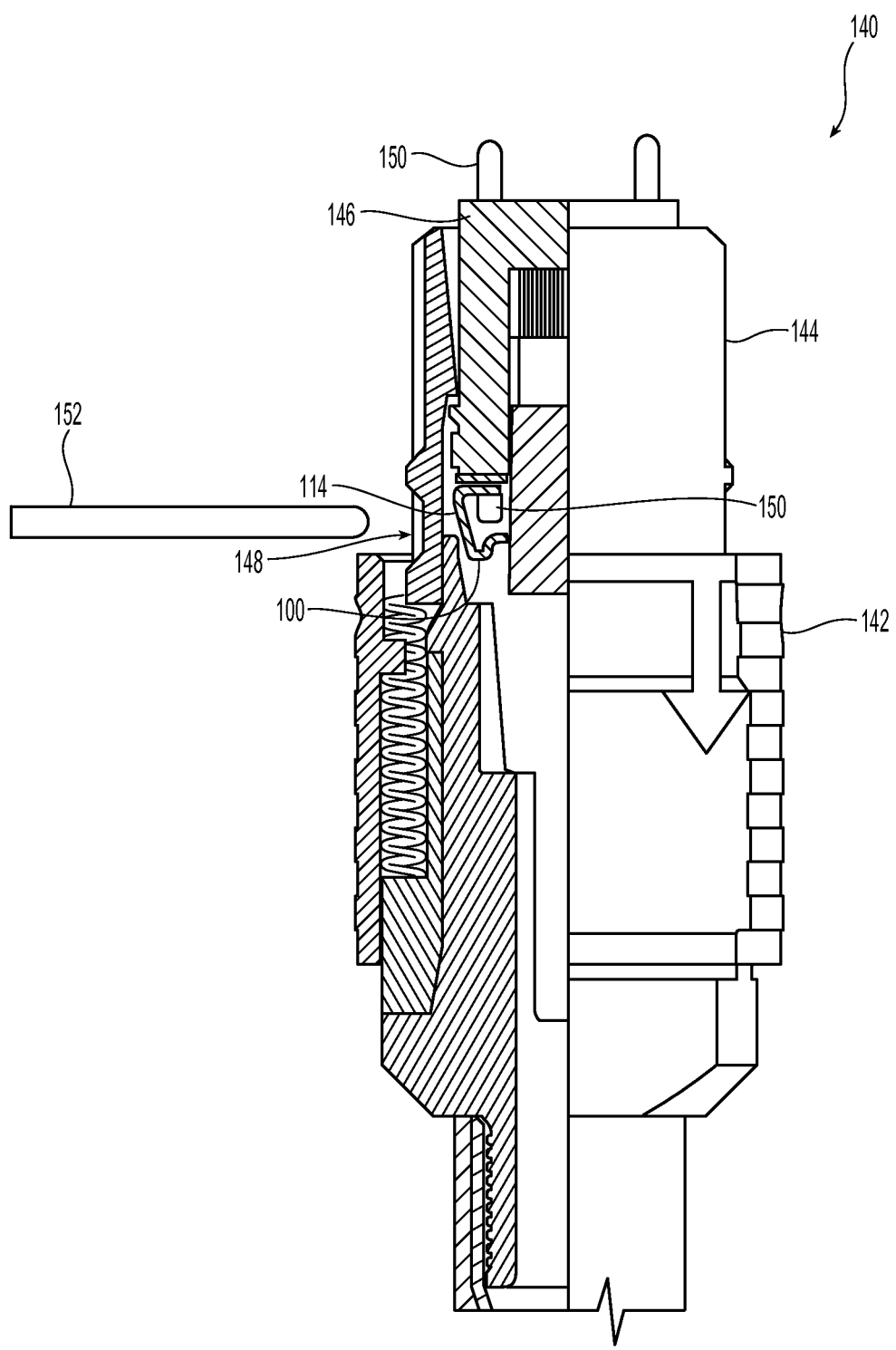
FIG. 6 is a partial cut away view of a fiber optic connector having the pin keeper of FIG. 1 installed therein ready to be engaged with a tool.
Figure 7:
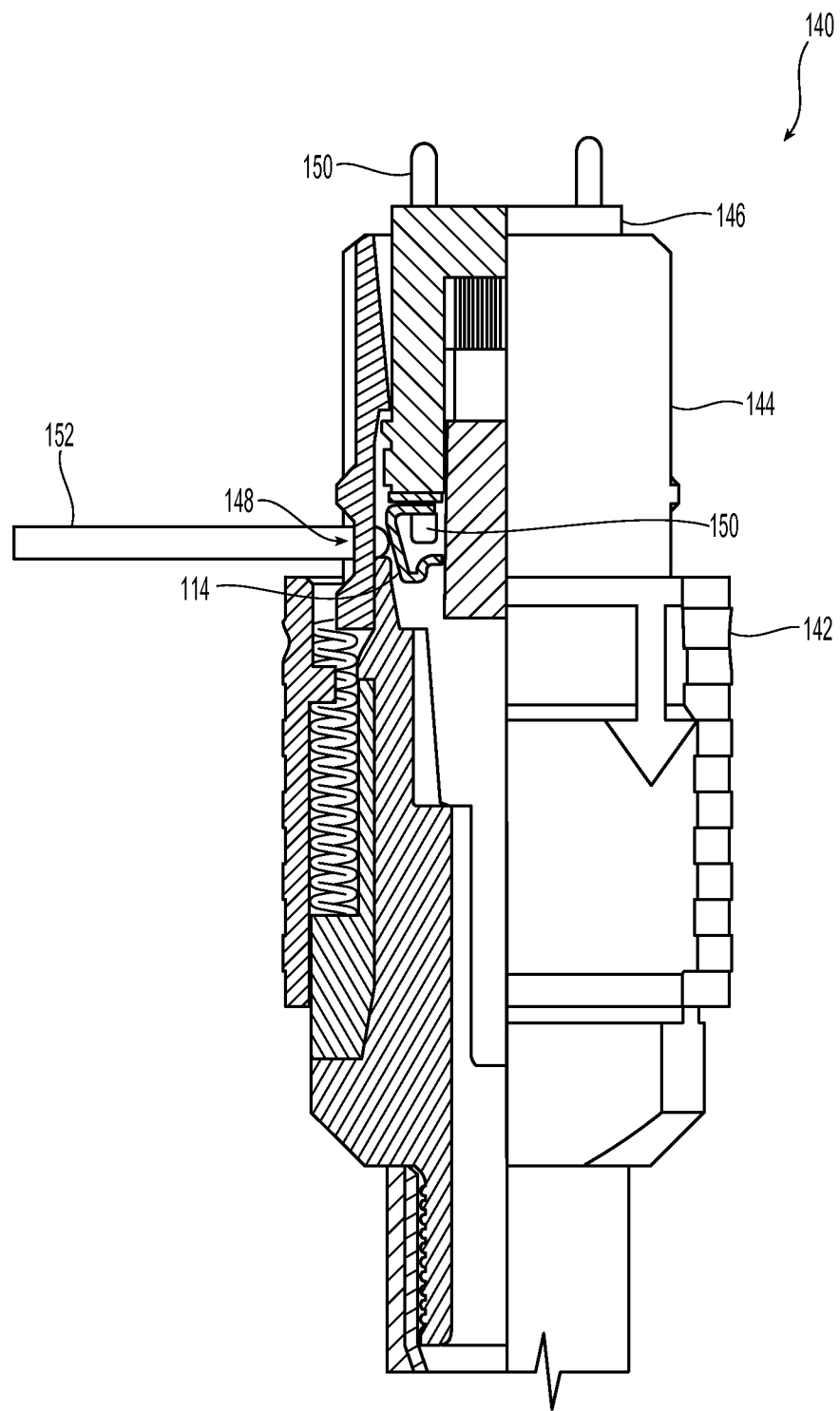
FIG. 7 is the fiber optic connector of FIG. 6 with the tool engaging the latch of the pin keeper of FIG. 1.

In FIGS. 6 and 7 an MTP fiber optic connector 140 is illustrated. As recognized by one of ordinary skill in the art, the MTP fiber optic connector 140 has an outer housing 142, an inner housing 144, and the fiber optic ferrule 146. To gain access to the latches 114,116 for a pin keeper 100 disposed in the fiber optic connector 140, the outer housing 142 and the fiber optic ferrule 146 are pushed rearward relative to the inner housing 144. The movement of the outer housing 142 exposes an opening 148 in the inner housing 144 and the movement of the fiber optic ferrule 146 positions the pin keeper 100 adjacent the opening 148 in the inner housing 144. At this point, the installer can insert a small tool (a guide pin would also work) 152 to press the latches 114,116 inward relative to the inner housing 144 and the pin keeper 100. See FIG. 6. While only one side is illustrated, this discussion is applicable to both sides. The movement of the latches 114,116 aligns the first guide pin openings 110, 112 and second guide pin openings 118,120 on their respective sides of the fiber optic connector 140. as discussed above. The alignment of the guide pin openings 110,112 allows for the insertion or removal of the guide pins 150 from the front of fiber optic ferrule 146. Once the guide pins 150 have been inserted or removed from the front of fiber optic ferrule 146, as the case may be, the tool 152 can be removed from the opening 148 to allow the latches 114,116 to return to their normal positions.

Figure 8:
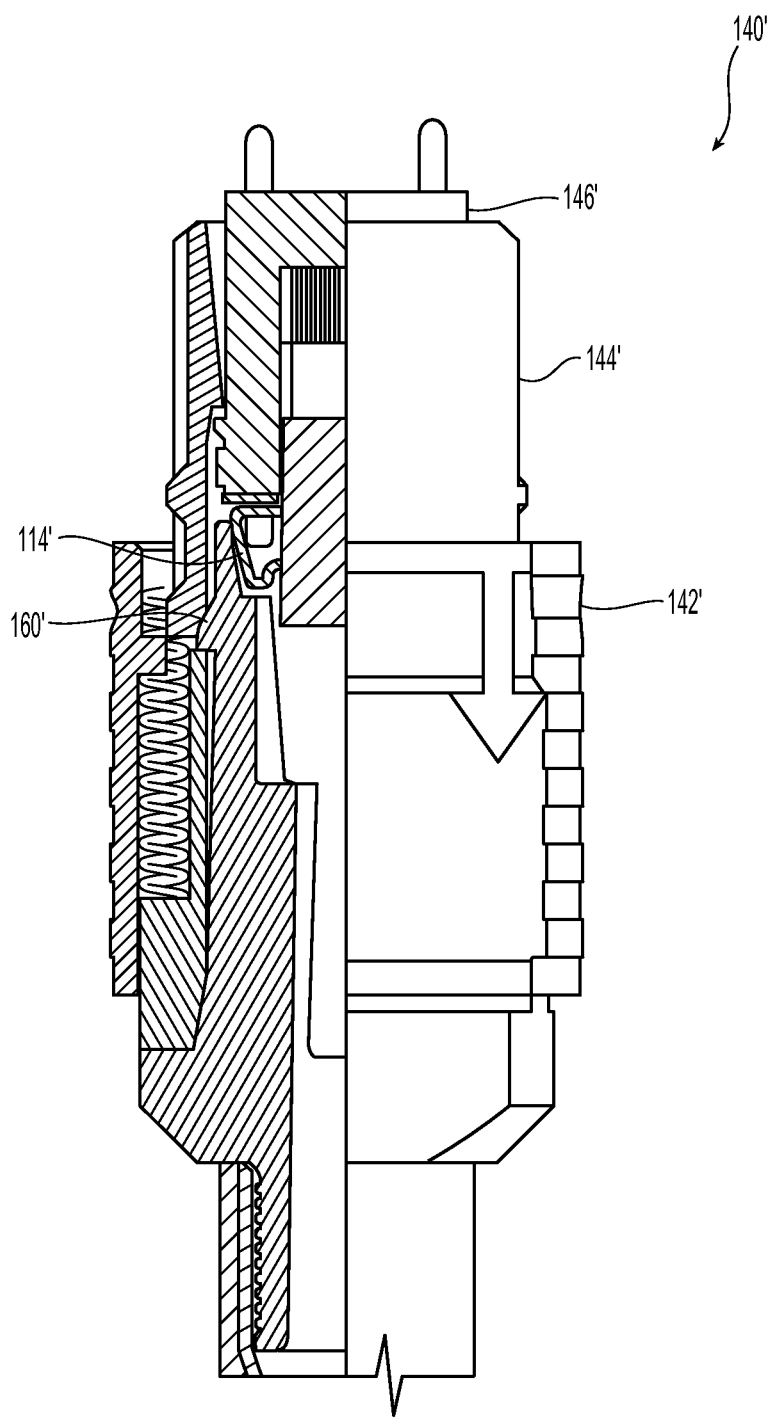
FIG. 8 is another embodiment of a fiber optic connector having a pin keeper according to another embodiment of the present invention.
Figure 9:
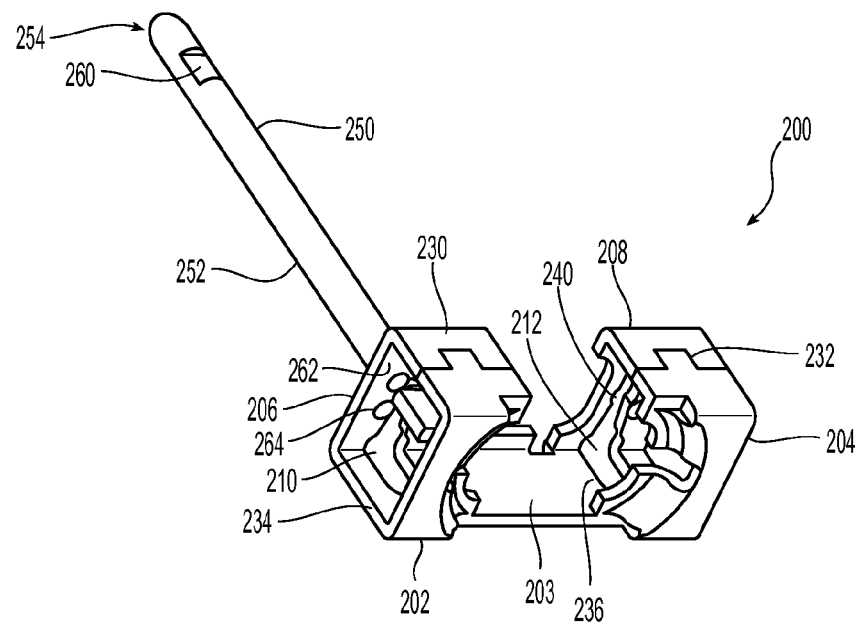
FIG. 9 is a rear perspective view another embodiment of a pin keeper according to the present invention.

There are alternative ways to move the latches 114,116 relative to the rest of the pin keeper 100. For example, as illustrated in FIG. 8, a modified spring push 160 could be used to move the latches 114,116. As noted above, the fiber optic ferrule 146 must be pushed farther than normal into the fiber optic connector to be able to engage the latches 114,116. In this embodiment, when the fiber optic ferrule 146' (and thus also the pin keeper 100) is moved rearwardly relative to the inner housing 144' in fiber optic connector 140', a spring push 160, preferably one that has a tapered end 162, engages the latches 114,116 and, because of the tapered end, pushes the latches 114,116 inward to align the first guide pin openings 110, 112 and second guide pin openings 118,120 on their respective sides of the fiber optic connector 140'. While only one side is illustrated in FIG. 8, one of ordinary skill in the art would understand that the same actions would occur on the opposite side of the fiber optic connector 140' (but a mirror image thereof).

It should be noted that the guide pins 150 to be used with the pin keeper 100 preferably have a groove around one end thereof. As is known in the art, the groove would be at the back and the front end would have a rounded portion to assist in aligning with the guide pin holes in another fiber optic ferrule. The groove is used with the second guide pin openings 118,120 to prevent removal of the guide pins 150 once the latches 114,116 are released.

Figure 10:
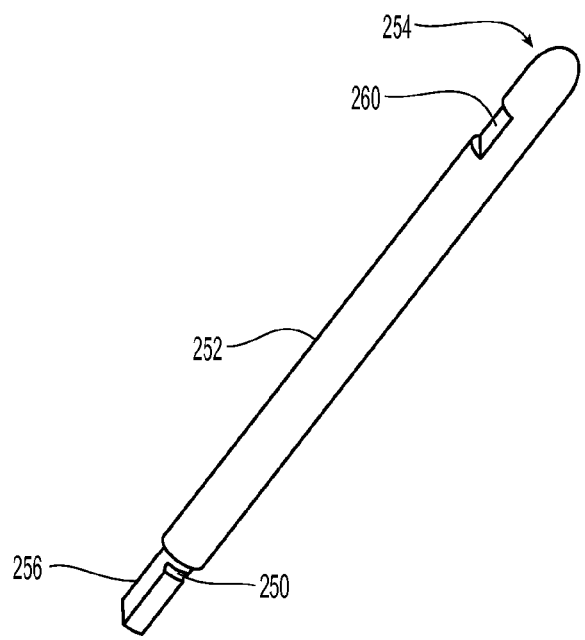
FIG. 10 is a perspective view of the an embodiment of a guide pin that can be used with the pin keeper of FIG. 9
Figure 11:
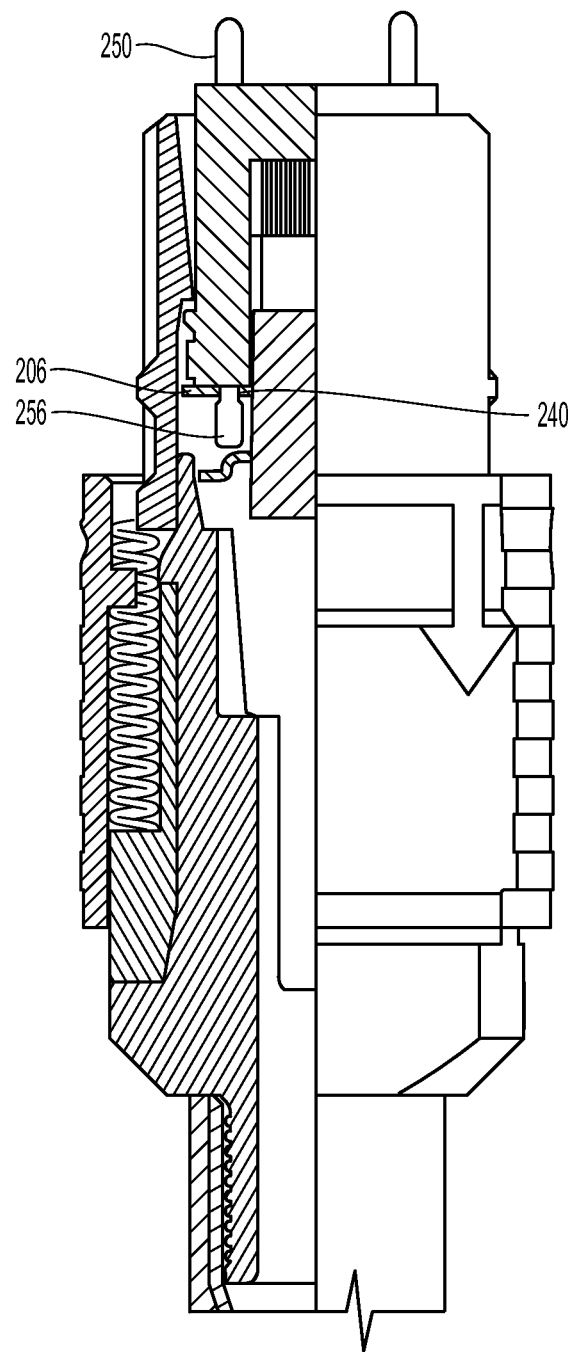
FIG. 11 is a perspective view of the pin keeper of FIG. 9 and the guide pin of FIG. 10 disposed within a fiber optic connector.
Figure 12:
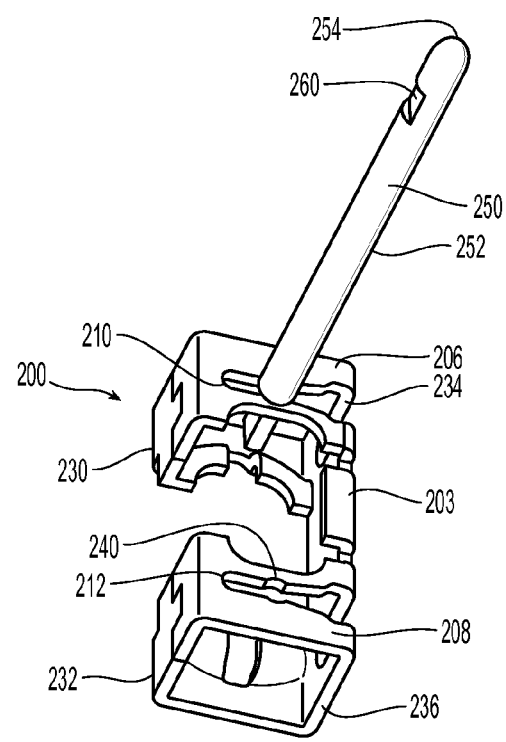
FIG. 12 is a front perspective view of the pin keeper of FIG. 9.

Another embodiment of a pin keeper 200 is illustrated in FIGS. 9-12. The pin keeper 200 has a first portion 202 and a second portion 204, the first and second portions 202, 204 generally aligning with a respective side of the fiber optic ferrule and the guide pin holes therein. The two portions 202,204 are connected to one another by a bridge portion 203, that can be either on the top or the bottom of the pin keeper 200, but it must be out of the way of the optical fibers that pass through the pin keeper 200 to be secured within the fiber optic ferrule. The first and second portions 202,204 each have a front wall 206,208, respectively, that includes a first guide pin opening 210, 212. See FIG. 12. The term "front" and "forward" as used herein means that same direction as noted above. The first and second portions 202,204 also have top walls 230,232 and bottom walls 234,236. The first guide pin openings 210, 212 are preferably elongated that extend along the front wall 206,208, from the near the top walls 230,232 to and through the bottom walls 234,236 and can be horizontal openings rather than the generally vertical openings illustrated herein. However, the first guide pin openings 210, 212 need not extend to the bottom walls 234,236. The first guide pin opening 210, 212 also preferably have a circular portion 240 in the middle thereof to maintain a guide pin 250 within the first guide pin openings 210, 212. The guide pin 250 to be used with the pin keeper 200 is illustrated in FIG. 10. The guide pin 250 has an elongated body 252 with a front end 254, a rearward end 256 and a groove 258 in the elongated body 252 near the rearward end 256. The guide pin 250 also has at least one slot or flat portion 260 near the front end 254, although the guide pin 250 may have two such flats or portions 260, 180 degrees apart around the guide pin 250. The particular shape of the rearward end 256 may be altered from that as illustrated, but the shape of the rearward end 256 should allow the rearward end 256 to pass through the elongated first guide pin openings 210, 212. See, e.g., FIG. 9. Once the rearward end 256 passes through the first guide pin openings 210, 212, the guide pin 250 is rotated so that the groove 258 is engaged in the circular portion 240 of the the first guide pin openings 210,212, and the rearward end 256 engages the front walls 206,208 (more particularly, a rearward facing surface 262 of the front wall 206,208). See FIG. 11. The slot 260 near the front end 254 is provided to allow the guide pin 250 to be rotated within the circular portion 240 relative to the pin keeper 200. The rearward facing surface 262 of the front wall 206,208 preferably has detents 264 between which a portion of the rearward end 256 of the guide pin 250 is disposed when installed. See FIG. 9. This prevents the guide pin 250 from rotating inadvertently during use. While the detents 264 are illustrated as being two rounded protrusions extending rearwardly from the rearward facing surface 260 of the front wall 206,208, they could take other shapes or configurations, as long as the detents prevented the guide pin 250 from inadvertently rotating.

Figure 13:
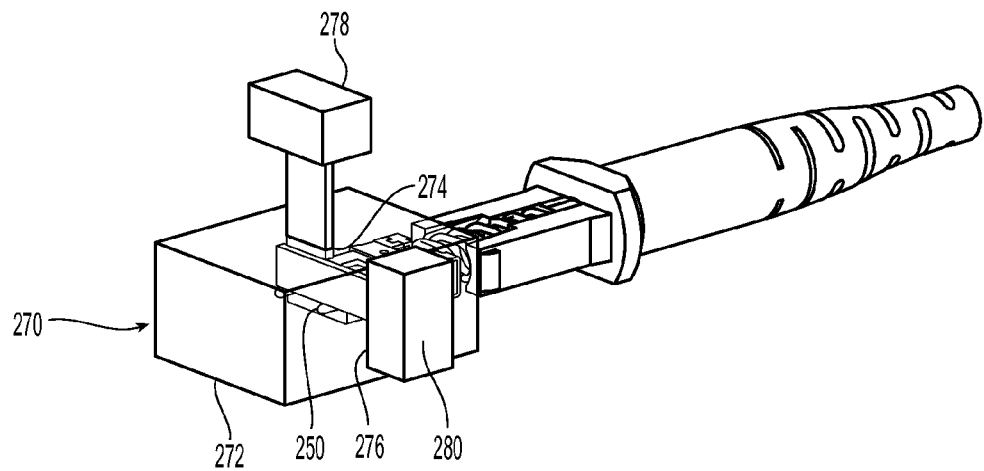
FIG. 13 is a front perspective view of a tool to be used with the fiber optic connector of FIG. 11.

A tool 270 may be used with the pin keeper 200 and the guide pin 250 as shown in FIG. 13. The tool 270 has a main portion 272 with two slots 274, 276 orthogonal to one another. Referring back to FIG. 10, the at least one slot or flat portion 260 on the guide pin 250 is pointed upward when the guide pin 250 is locked in the pin keeper 200 (as would be obvious to one of ordinary skill in the art, the least one slot or flat portion 260 on the guide pin 260 could also be pointed upward when the guide pin is unlock and the functions described herein would still be applicable). With the guide pins 250 (and a portion of the ferrule) inserted into the main portion 272 and the slots or flat portions 260 on the guide pins 250 are pointed upward, a first tool blade 278 is pushed downward toward the guide pins 250. The first tool blade 278 is narrower than the distance between center lines of the guide pins 250. The first tool blade 278 is arranged to engage the inside portions of both guide pins 250 at the slots or flat portions 260, causing the guide pins 250 to rotate toward each other as the first tool blade 278 is pushed into the main portion 272. The edges of the blade 278 engage the slots or flat portions 260. When the guide pins 250 rotate, they rotate 90 degrees, causing the guide pins 250 to become unlocked from the pin keeper 200. With the blade 278 being dimensioned as noted above, the guide pins 250 are essentially locked in the tool 270 until the blade 278 is removed from the tool 270 and within the slots or flat portions 260 of each guide pin 250.

To insert the guide pins 250 into the pin keeper 200, the guide pins 250 are inserted into the tool 270 with the slots or flat portions 260 facing the second blade 280 on the side of the tool 270. The second blade 280 is positioned such that it engages only a portion of the guide pins 250 at the slots or flat portions 260. The engagement of the second blade 280 on the edge of the guide pins 250 causes the first guide pin 250 to rotate 90 degrees and then the second blade 280 passes through the slot or flat portion 260 in the first guide pin 250 to engage and rotate the second guide pin 250. The position of the second blade 280 relative to the guide pins 250 and the slots or flat portions 260 locks the guide pins 250 into the pin keeper 200. The second blade 280 can then be removed from the tool 270 to allow the tool 270 to be removed from the guide pins 250 and the front of the ferrule. Indeed, any of the guide pins discussed herein may have the slots or flat portions as described above and fall within the scope of the present invention.

Figure 14:
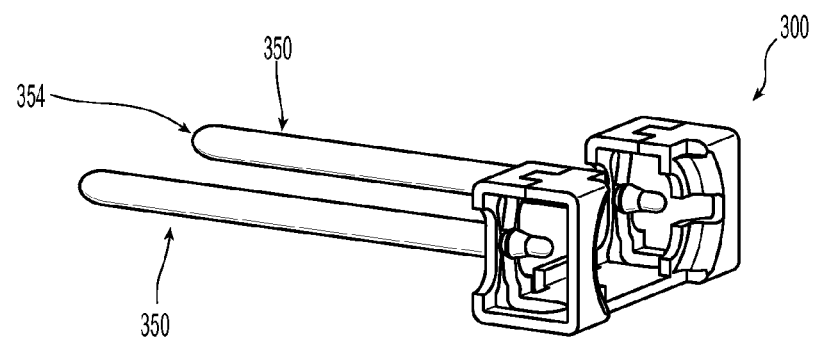
FIG. 14 is a rear perspective view another embodiment of a pin keeper and guide pins according to the present invention.
Figure 15:
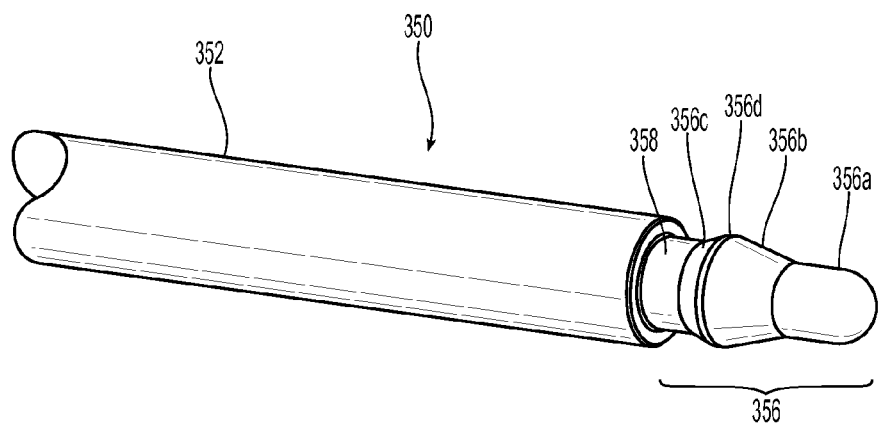
FIG. 15 is a plan view of another embodiment of a guide pin according to the present invention.
Figure 16:
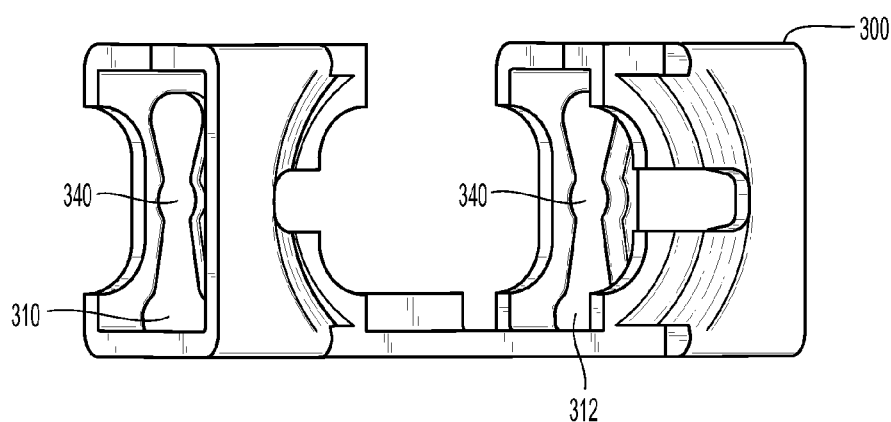
FIG. 16 is a rear perspective view of the pin keeper of FIG. 14.

Alternatively, a different guide pin 350 illustrated in FIGS. 14 & 15 may be used with the pin keeper 300 illustrated in FIGS. 14 and 16. Guide pin 350 has an elongated body 352 with a front end 354, a rearward end 356 with a groove 358 in the elongated body 352 near the rearward end 356. The rearward end 356 has at least three portions that are tied to the guide pin's function. The first portion is the rounded end 356a. The rounded end 356a assists in inserting the guide pin 350 into the guide pin openings 310, 312. A first sloped portion 356b is adjacent the rounded end 356a and provides a surface that is used to force the guide pin openings 310, 312 open to allow insertion of the guide pin 350 into the guide pin openings 310, 312. The portion of the pin keeper 300 that forms the guide pin openings 310, 312 (front wall) is somewhat pliable and moves enough to allow the guide pin 350 to be inserted therein when the guide pin 350 is pushed into the guide pin openings 310, 312 with sufficent force. Disposed between the first sloped portion 356b and the groove 358 is a second sloped portion 356c, that performs the same function as first sloped portion 356b discussed above, but performs that same function when the guide pin 350 is to be removed from the pin keeper 300. The degree of the slope on the sloped portions 356b,356c may be altered depending on the size of the guide pin openings 310, 312, the elasticity of the pin keeper 300, the length of the rearward end 356, etc. As illustrated, there may also be a flat portion 356d between the two sloped portions 356b,356c.

The pin keeper 300 may also have other features that assist in the ease with which the guide pin 350 is inserted and removed. For example, as illustrated in FIG. 16, the pin keeper 300 has a circular opening portion 340 in the middle of the guide pin openings 310, 312. The edges of the pin keeper 300 that form the circular portion 340 may be rounded (chamfered), allowing for the guide pin 350 to be more easily removed and inserted.

Figure 17:
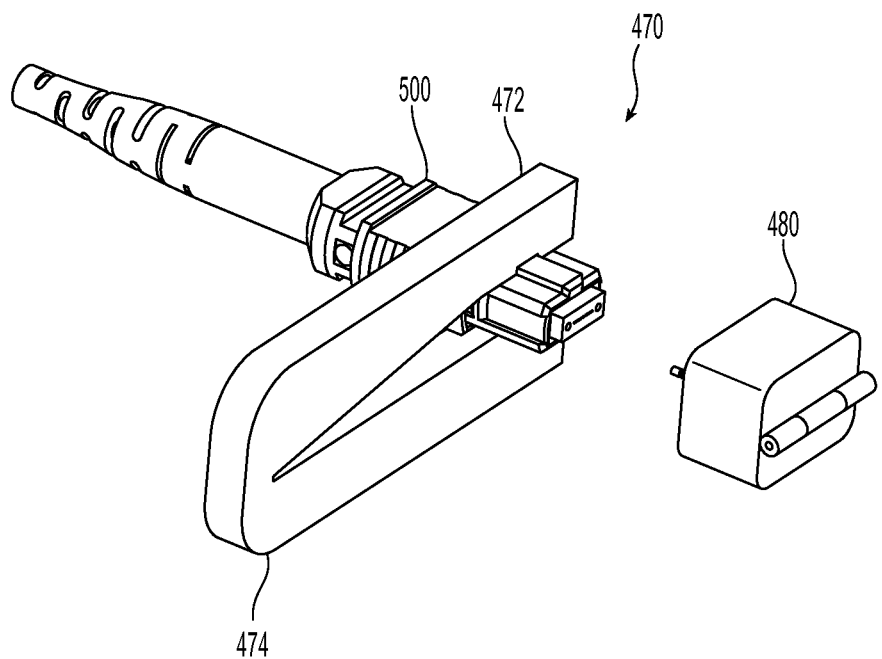
FIG. 17 is a perspective view of another embodiment of a fiber optic connector with a tool to remove/insert guide pins and a guide pin holder according to the present invention.
Figure 18:
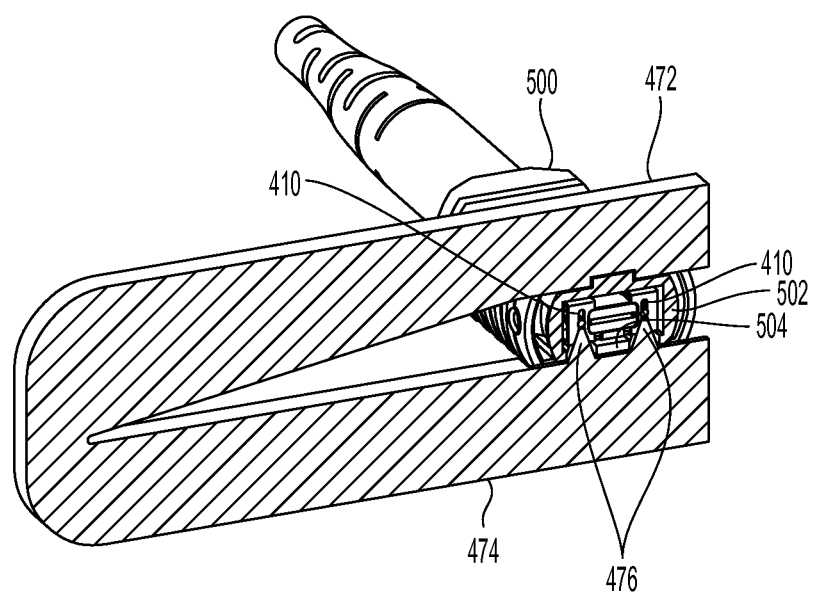
FIG. 18 is a partial cross sectional view of the fiber optic connector, tool and pin keeper of FIG. 17.

Another tool 470 can be used with a pin keeper to open the guide pin openings to allow for insertion and removal of guide pins in the field, or at least without having to disassemble the fiber optic connector. As illustrated in FIGS. 17 and 18, a pin keeper 400 has first and second portions 402,404, each of which have a front wall 406,408 that includes a first guide pin opening 410,412, respectively. The term "front" and "forward" as used herein means that same direction as noted above. The first and second portions 402,404 also have top walls 430,432 and bottom walls 434,436. The first guide pin openings 410, 412 are preferably elongated that extend along the front wall 406,408, from the near the top walls 430,432 to and through the bottom walls 434,436. The fiber optic connector 500 has openings in the bottom thereof (the inner housing as the outer housing would be moved rearwardly to expose the openings) to receive projections that can be inserted into the first guide pin openings 410,412 through the bottom walls 434,436. The projections would enlarge the guide pin openings 410,412 to allow the guide pins 450 to be removed or inserted through the front of the fiber optic connector 500.

The tool 470 is one such device. The tool 470 has an upper portion 472 that is preferably configured to engage the top of the fiber optic connector 500, most preferably the inner housing 502, and a lower portion 474 that is configured to engage the bottom of the fiber optic connector 500, again most preferably the inner housing 502. The inner housing 502 of the fiber optic connector 500 has openings 504 that are disposed below the guide pin openings 410,412 in pin keeper 400. The upper portion 472 and a lower portion 474 are hingedly connected to one another and when the upper portion 472 and a lower portion 474 are moved relative to one another with the fiber optic connector 500 therebetween, the projections 476 on the lower portion 474 extend through the openings 504 in the inner housing 502 of the fiber optic connector 500 that are below the guide pin openings 410,412 in pin keeper 400. The projections 476, as they are inserted into the guide pin openings 410,412, cause the guide pin openings 410,412 to open and allow for the insertion and/or removal of guide pins 450.

Additionally, a guide pin holder 480 can also be used to insert or remove the guide pins 450 to prevent damage to the guide pins or the fiber optic connector 500. The guide pin holder would also ensure that the guide pins 450 are inserted into the fiber optic connector 500 at the correct depth.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A pin-keeper for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, the pin-keeper comprising:
   a first portion to receive a first guide pin;
   a second portion to receive to a second guide pin;
   a bridge portion connecting the first portion and the second portion;
   a first guide pin opening in each of the first and second portions to receive a portion of a guide pin therein, the first guide pin openings in the first and second portions of the pin-keeper aligned with the guide pin openings in the fiber optic ferrule when the fiber optic ferrule and pin-keeper are disposed within the fiber optic connector;
   a first latch associated with the first portion and having a second guide pin opening therein, the first latch and the second guide pin opening therein movable relative to the first portion and the first guide pin opening therein; and
   a second latch associated with the second portion and having a second guide pin opening therein, the second latch and the second guide pin opening therein movable relative to the second portion and the first guide pin opening therein.

2. The pin-keeper according to claim 1, wherein the first and second latches are disposed adjacent an opening in the fiber optic connector.

3. The pin-keeper according to claim 1, wherein the first and second portions have a stop disposed rearwardly from each of the respective first guide pin openings to prevent a guide pin inserted through guide pin openings in the ferrule and into the pin-keeper from traveling beyond the stop.

4. The pin-keeper according to claim 1, wherein the latch is moveable between a first position and a second position, and wherein in the first position the first and second guide pin openings are not aligned with one another.

5. The pin-keeper according to claim 1, wherein the latch is moveable between a first position and a second position, and wherein in the second position the first and second guide pin openings are aligned with one another.

6. The pin-keeper according to claim 1, wherein the first and second guide pin openings have the same diameter.

7. The pin-keeper according to claim 1, wherein the first latch is connected to the first portion and the second latch is attached to the second portion.

8. The pin-keeper according to claim 1, wherein the latches engage a groove on a guide pin to retain the guide pin within the pin-keeper.

9. The pin-keeper according to claim 1, wherein a portion of the fiber optic connector is movable relative to the pin-keeper and the portion of the fiber optic connector moves the latches from a first position to a second position.

10. A combination of a pin-keeper and guide pin for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, comprising:
a pin-keeper comprising:
a first portion to receive a first guide pin;
a second portion to receive to a second guide pin;
a bridge portion connecting the first portion and the second portion;
a guide pin opening in each of the first and second portions to receive a portion of a guide pin therein, the guide pin openings in the first and second portions of the pin-keeper aligned with the guide pin openings in the fiber optic ferrule when the fiber optic ferrule and pin-keeper are disposed within the fiber optic connector, wherein the guide pin openings in each of the first and second portions having an elongated configuration; and
at least one guide pin comprising:
an elongate cylindrical element having a rounded front end;
a rear end having a rectangular cross section; and
a groove dispose between the elongate cylindrical element and the rear end, the groove being circular in cross section and having a diameter smaller than the elongate cylindrical element.

11. The combination of a pin-keeper and guide pin according to claim 10, wherein the first and second portions have a front surface and a rear surface, the front surface being adjacent the fiber optic ferrule and the rear surface facing away from the fiber optic ferrule, the rear surface having at least one projection extending from the rear surface and away from the front surface.

12. The combination of a pin-keeper and guide pin according to claim 10, wherein the at least one guide pin has a maximum width that is smaller than the guide pin openings in the fiber optic ferrule.

13. The combination of a pin-keeper and guide pin according to claim 10, wherein the elongate cylindrical element of the at least one guide pin has at least one generally flat portion disposed adjacent the rounded front end.

14. The combination of a pin-keeper and guide pin according to claim 13, wherein the generally flat portion is disposed outside of the fiber optic ferrule when the combination of the pin-keeper and the at least one guide pin are installed within the fiber optic ferrule.

15. A combination of a pin-keeper and guide pin for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, comprising:
a pin-keeper comprising:
a first portion to receive a first guide pin;
a second portion to receive to a second guide pin;
a bridge portion connecting the first portion and the second portion;
a guide pin opening in each of the first and second portions to receive a portion of a guide pin therein, the guide pin openings in the first and second portions of the pin-keeper aligned with the guide pin openings in the fiber optic ferrule when the fiber optic ferrule and pin-keeper are disposed within the fiber optic connector, wherein the guide pin openings in each of the first and second portions having an elongated configuration; and
at least one guide pin comprising:
an elongate cylindrical element having a rounded front end;
a rear end; and
a groove dispose between the elongate cylindrical element and the rear end, the groove being circular in cross section and having a diameter smaller than the elongate cylindrical element,
wherein the first and second portions have a front wall, a rear wall, a top wall extending between the front and rear walls, a bottom wall extending between the front and rear walls, the bridge member connecting the bottom walls of the first and second portions, and wherein the guide pin opening extends through the front wall and through a portion of the bottom wall.

16. The combination of a pin-keeper and guide pin according to claim 15, wherein the front walls adjacent the guide pin openings are chamfered.

17. A combination of a pin-keeper and guide pin for use with a fiber optic connector, the fiber optic connector having at least one housing, a fiber optic ferrule disposed at least partially within the at least one housing of the fiber optic connector, the fiber optic ferrule having guide pin openings extending from a front face to a rear face of the fiber optic ferrule to receive a guide pin therein, comprising:
a pin-keeper comprising:
a first portion to receive a first guide pin;
a second portion to receive to a second guide pin;
a bridge portion connecting the first portion and the second portion;
a guide pin opening in each of the first and second portions to receive a portion of a guide pin therein, the guide pin openings in the first and second portions of the pin-keeper aligned with the guide pin openings in the fiber optic ferrule when the fiber optic ferrule and pin-keeper are disposed within the fiber optic connector, wherein the guide pin openings in each of the first and second portions having an elongated configuration; and
at least one guide pin comprising:
an elongate cylindrical element having a rounded front end;
a rear end; and
a groove dispose between the elongate cylindrical element and the rear end, the groove being circular in cross section and having a diameter smaller than the elongate cylindrical element, wherein the rear end of the at least one guide pin has a first sloped portion and a second sloped portion, the first and second sloped portions having a circular portion disposed therebetween, the first sloped portion creating a first surface directed away from the second portion and the second sloped portion creating a second surface directed away from the first sloped portion, the first and second sloped portions having a smallest diameter that is larger than the guide pin opening in each of the first and second portions.

* * * * *